United States Patent

Harada et al.

[11] Patent Number: 5,974,191
[45] Date of Patent: Oct. 26, 1999

[54] IMAGE PROCESSING APPARATUS AND METHOD

[75] Inventors: Takashi Harada, Yokohama; Kazutoshi Shimada, Yokosuka; Eisaku Tatsumi, Kawasaki; Shigeki Mori, Koshigaya; Kazuhiro Matsubayashi, Yokohama; Shinichi Sunakawa, Kawasaki; Katsuhiko Nagasaki, Ichikawa, all of Japan

[73] Assignee: Canon Kabushiki Kaisha, Tokyo, Japan

[21] Appl. No.: 08/950,180

[22] Filed: Oct. 14, 1997

Related U.S. Application Data

[63] Continuation of application No. 08/350,971, Nov. 29, 1994, abandoned.

[30] Foreign Application Priority Data

Dec. 9, 1993 [JP] Japan .................................. 5-309142

[51] Int. Cl.⁶ .................................................. G06K 9/44
[52] U.S. Cl. .................................... 382/258; 382/259
[58] Field of Search .................................. 382/257, 259, 382/258, 254

[56] References Cited

U.S. PATENT DOCUMENTS

| | | | |
|---|---|---|---|
| 5,065,437 | 11/1991 | Bloomberg | 382/258 |
| 5,202,933 | 4/1993 | Bloomberg | 382/257 |
| 5,335,294 | 8/1994 | Niki | 382/177 |

Primary Examiner—Andrew W. Johns
Assistant Examiner—Monica S. Davis
Attorney, Agent, or Firm—Fitzpatrick, Cella, Harper & Scinto

[57] ABSTRACT

An image containing characters and lines, which is inputted by a scanner or the like, is binarized and stored in a memory. A thickening process is repeatedly applied on groups of significant bits stored in the memory, until a predetermined condition is fulfilled. After this process, the thickened image is thinned at least a greater number of times than the number of times the thickening process is repeated in order to eliminate lines. As a result, characters are determined to exist at areas where groups composed of remaining significant dots exist, then characters are separated from the input image based on the areas of groups composed of the remaining significant dots.

21 Claims, 8 Drawing Sheets

FIG. 3
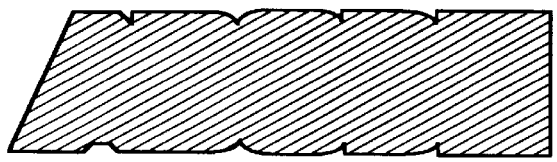
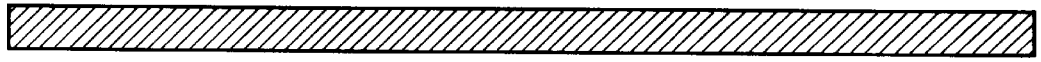
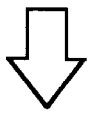
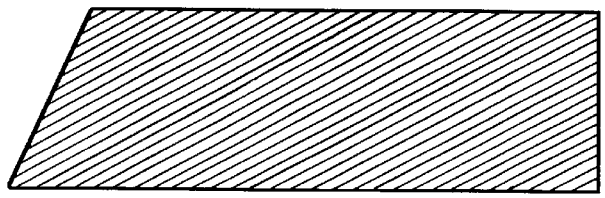
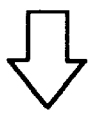
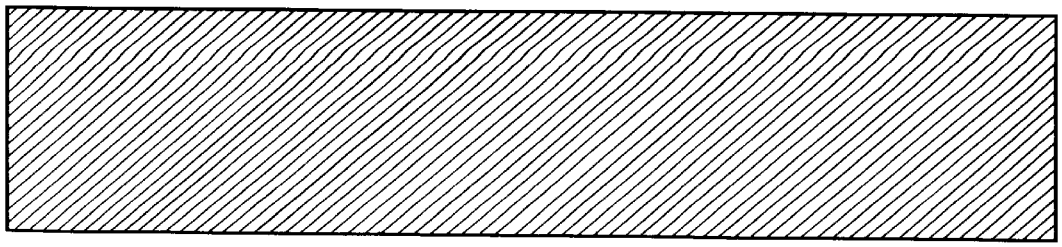

FIG. 7

| RESOLUTION | WIDTHS OF LINE | FONT SIZE | MAXIMUM NUMBER OF TIMES TO REPEAT THICKENING PROCESS |
|---|---|---|---|
| 200 | THIN | SMALL | $n_1$ |
| 200 | THIN | MEDIM | $n_2$ |
| 200 | THIN | LARGE | $n_3$ |
| 200 | MEDIUM | SMALL | $n_4$ |
| 200 | MEDIUM | MEDIUM | $n_5$ |
| 200 | MEDIUM | LARGE | $n_6$ |
| 200 | THICK | SMALL | $n_7$ |
| ⋮ | ⋮ | ⋮ | ⋮ |
| 400 | THIN | SMALL | $n_m$ |
| ⋮ | ⋮ | ⋮ | ⋮ |

IMAGE PROCESSING APPARATUS AND METHOD

This application is a continuation of application Ser. No. 08/350,971 filed Nov. 29, 1994, now abandoned.

BACKGROUND OF THE INVENTION

The present invention relates to an image processing apparatus and method and, more particularly, to an image processing apparatus and method capable of separating characters and lines in an image.

Assume that an original image having characters and lines, such as maps and drawings, read by a scanner or the like is processed, for instance, edited and/or searched for characters, by a computer. Conventionally, the original image is binarized, labeled, and thinned, and so on, numbers and length of groups of the labeled pixel are determined, then labeled pixel groups having relatively large numbers of pixels (having a long length) are recognized as lines, and labeled pixel groups of relatively short lengths are recognized as characters. Thus, both lines and characters are extracted at the same time.

In the conventional method as described above, extraction as well as recognition of characters and lines are performed in parallel. Therefore, there is a problem in that it takes quite a long preparation time for the process.

SUMMARY OF THE INVENTION

The present invention has been made in consideration of the above situation, and has as its object to provide an image processing apparatus and method which enable separation of characters and lines efficiently when an image having lines and characters is inputted.

According to the present invention, the foregoing object is attained by providing an image processing apparatus which inputs an image containing characters and lines and separates the characters, comprising: thickening means for thickening groups of significant dots of the input image repeatedly until newly added dots after each thickening process fulfill a predetermined condition; thinning means for thinning the image thickened by the thickening means, at least a greater number of times than the number of times the thickening process was repeated; and determining means for determining an area, which is left after the thinning process, of significant dots as a character area.

Further, the foregoing object is attained by providing an image processing method of inputting an image containing characters and lines and of separating the characters, comprising steps of: thickening groups of significant dots of the input image repeatedly until newly added dots after each thickening step fulfill a predetermined condition; thinning the image thickened at the thickening step, at least a greater number of times than the number of times the thickening step is repeated; and determining an area, which is left after the thinning step, of significant dots as a character area.

According to the configuration of the image processing apparatus and method of the present invention as described above, a thickening process is repeatedly performed on an input image until a number of newly added significant dots after each thickening process fulfill a predetermined conditions. Next, a thinning process is repeated a greater number of times than the number of times the thickening process is repeated, in order to erase lines. As a result, areas where the remaining significant pixels exist are determined as character image areas.

Other features and advantages of the present invention will be apparent from the following description taken in conjunction with the accompanying drawings, in which like reference characters designate the same or similar parts throughout the figures.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 shows a transition of an image in a thickening process according to the first embodiment;

FIG. 7 shows an example of a table for setting a number of times a thickening process should be repeated.

DETAILED DESCRIPTION OF THE EMBODIMENTS

Preferred embodiments of the present invention will be described in detail in accordance with the accompanying drawings.

Figure 1:
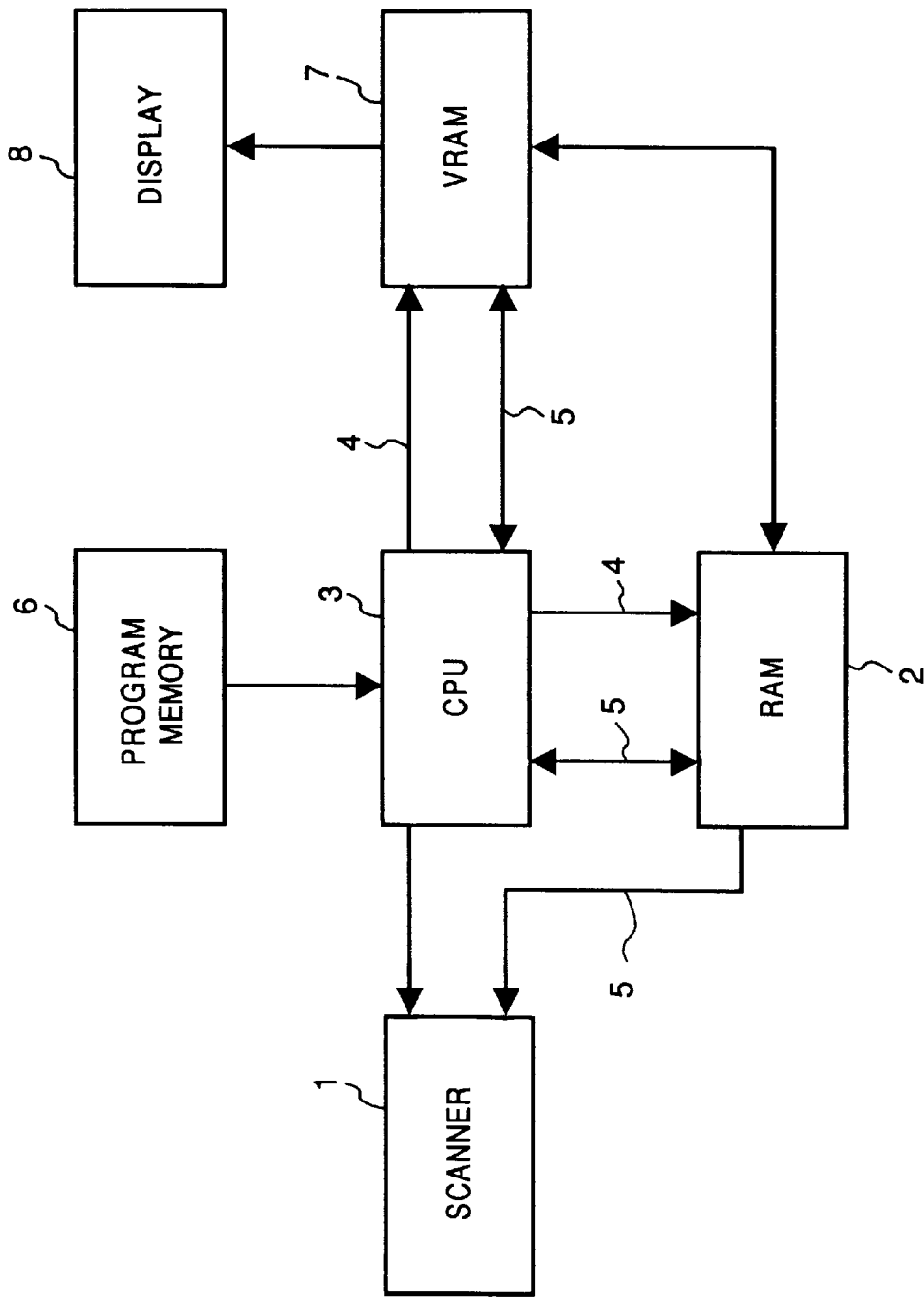
FIG. 1 is a block diagram of an image processing apparatus according to a first embodiment.
Figure 2:
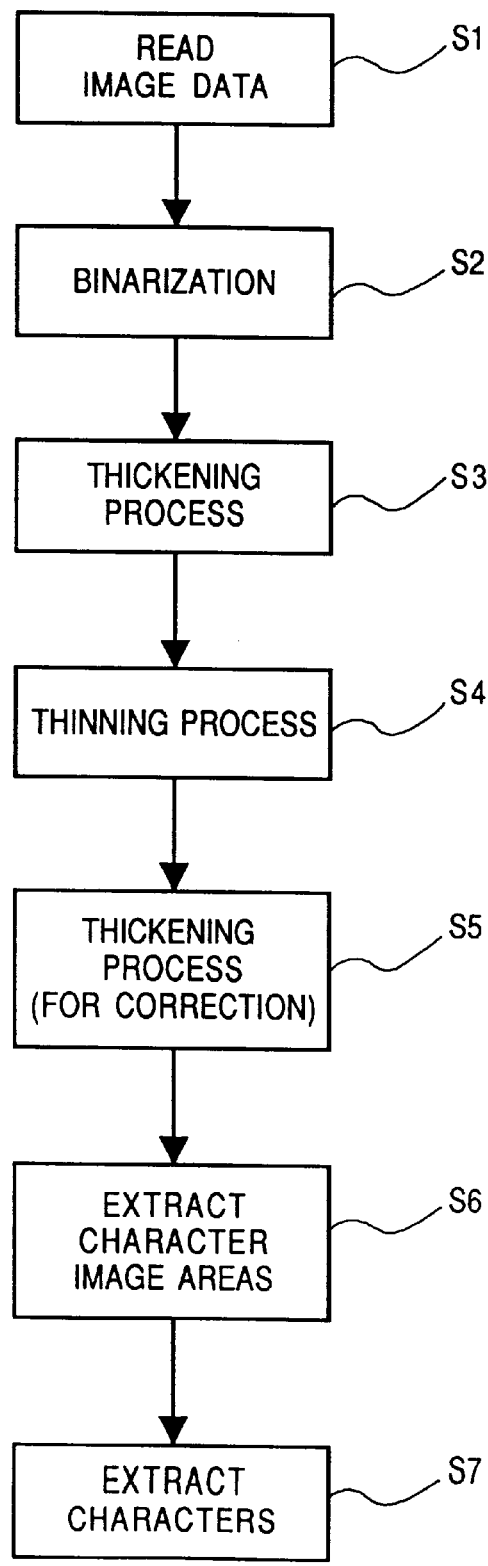
FIG. 2 is a flowchart explaining a process according to the first embodiment.

FIG. 1 illustrates a construction of an image processing apparatus according to a first embodiment, and FIG. 2 shows a processing sequence performed by CPU 3 in FIG. 1. The program which controls the process is stored in a program memory 6 in FIG. 1.

In FIG. 1, reference numeral 1 denotes a scanner as an image input device for reading an original image, reference numeral 2 denotes a RAM for temporarily storing various kinds of data, such as image data, which is transmitted from the scanner 1, and reference numeral 3 denotes a CPU for controlling the entire operation of the apparatus, where the CPU 3 controls a process shown in FIG. 2 based on a control program stored in the program memory 6. Further, reference numeral 4 denotes an address bus for designating an address to access data stored in the RAM 2; 5, a data bus for inputting and outputting the data of the address designated by the address bus 4 and for transmitting data from the scanner 1 to the RAM 2 or the CPU 3; 7, a VRAM for storing data to be displayed on a display 8.

The operation of the CPU 3 according to the first embodiment will be described with reference to FIG. 2.

First, at step S1, image data is read by the scanner 1, and stored in the RAM 2. Next, at step S2, the image data is binarized. At step S3, a thickening process is applied on an arbitrary pixel $f_{ij}$ of the image data binarized at step S2, according to the following function (1), $$g_{ij} = \begin{cases} 1; & fij = 1, \text{ or one of} \\ & \text{eight neighboring pixels} = 1 \\ 0; & \text{otherwise} \end{cases} \quad (1)$$

where "1" indicates a significant dot, namely a print dot.

This process makes widths of lines thicker as well as combines character strings into lumps. A transition of lines and characters in this process is shown in FIG. 3.

In this embodiment, lines are assumed to have a width of one dot, a length of 75 dots, and distances between lines are 4 dots. After the thickening process is applied once, the width of the lines becomes 3 dots (gains 2 dots), and a total number of significant dots added to the three lines is 468 (=(75×2+(1+2)×2) ×3).

After the thickening process is repeated, a number of newly added significant dots to the already thickened lines is 492 (=(75+2×2+(3+2)×2)×3). Note that after performing the thickening process twice, the three lines become one lump as shown in the bottom of FIG. 3.

Further, if another thickening process is applied, then a number of newly added significant dots is 188 (=(75+2+2)× 2+15×2). Thus the number of newly added significant dots decreases compared to the two previous thickening processes.

Therefore, the thickening process is terminated two times before when the number of dots added during the current thickening process is less than the number of dots added during the previous thickening process. After repeating the thickening process the required number of times, the obtained image data is outputted at step S3.

Note that in a case where there is only one line existing, since a number of newly added significant dots never decreases after each thickening process, the process should be repeated a predetermined number of times.

At step S4, a thinning process is performed on an arbitrary dot, $f_{ij}$, in the image data outputted at step S3, based on the following equation (2).

$$g_{ij} = \begin{cases} 0; & fij = 0, \text{ or one of} \\ & \text{eight neighboring pixels} = 0 \\ 1; & \text{otherwise} \end{cases} \quad (2)$$

where if $f_{ij}$ before the thinning process is "1" and all eight neighboring pixels are "1", then $f_{ij}$ remains "1".

Figure 4:
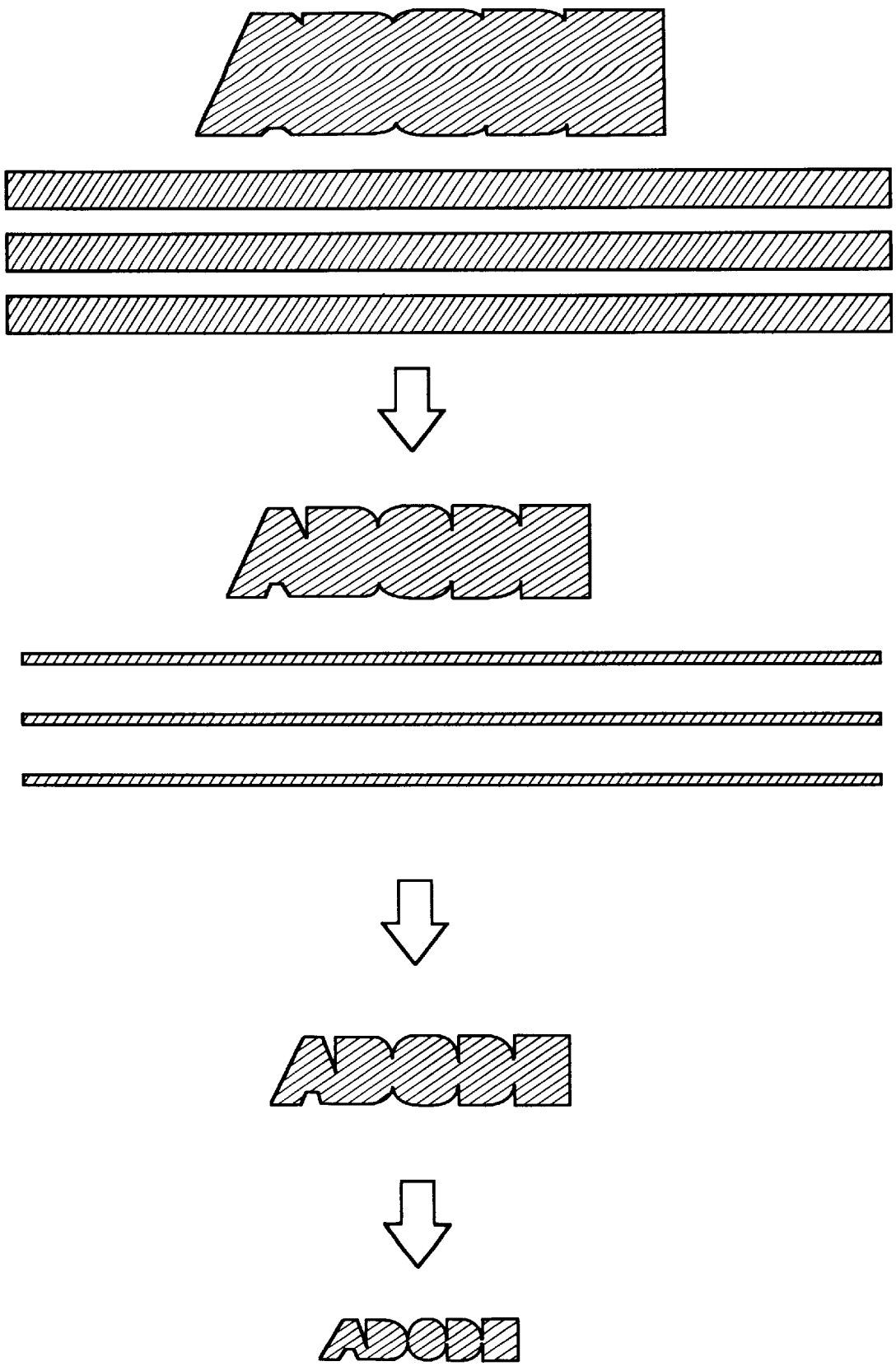
FIG. 4 shows a transition of the image in a thinning process according to the first embodiment.

By performing this operation, widths of lines can be thinned. A transition of the image is shown in FIG. 4. Contrary to the process at step S3, the number of deleted significant dots is counted at step S4. After repeating the thinning process three times, only the significant dots of lumped characters are left, thus, if the process is repeated one more time, a smaller number of significant dots is deleted compared to the number of deleted significant dots after the previous process. Thus, the thinning process is repeated until the number of newly erased significant dots decreases sharply.

As a result of the above processing by letting the numbers of times to repeat the thickening process and the thinning process be m and n, respectively, the lines totally disappear when m<n. Note that n is decided based on m, for example, m=n+α (α=1, 2, . . .). In addition, an area of joined significant dots which represent a character string after the thickening and thinning processes is smaller than a corresponding character string area in the original image. Thus, the thickening process is repeated (n−m) times at step S5.

Next, a lump of significant dots is extracted from the image data outputted at step S5, then a rectangular area surrounding the lump is determined at step S6. More specifically, a logical "AND" operation between the image data obtained after the thickening process at step S5 and the image binarized soon after being inputted is performed.

At step S7, a rectangular area which corresponds to the determined rectangular area is extracted from the original image data, then characters are extracted from the extracted rectangular area. In order to separate characters in the extracted area, first, numbers of print dots are counted in the vertical and horizontal directions, and histograms are made based on the counted numbers. Then, areas having local minimum numbers in the histograms are determined as spaces between characters, and areas having global and local maximums are determined as characters.

It should be noted that, in the first embodiment, the input original image data is stored in the RAM 2 first, then binarized. However, the original image can be binarized during input by comparing image data from the scanner 1 with a predetermined threshold value, so that the RAM 2 stores the binarized image.

Further, according to the aforesaid example, lumps of significant dots which represent characters are left by repeating the thickening process and thinning process. In order to complete the process according to the first embodiment, there is required additional memory space in the RAM 2 for storing unprocessed original image data, or the original image has to be read again. Thus, the original image can be temporarily stored in a low priced hard disk, or the like, then after necessary information on the character area in the RAM 2 is extracted by performing the aforesaid processes, the original image can be written in the RAM 2 for separating characters and recognizing them. This alternative method to store the original image in the hard disk can be applied in the embodiments.

According to the first embodiment as described above, character areas can be extracted in high speed from original image data including, a mixture of both characters and lines by performing simple processes.

Accordingly, by using a character recognition apparatus to which the aforesaid configuration is employed, a preparation time before starting extracting character images is shortened, therefore, character recognition is performed in high speed from an operator's point of view.

Figure 5:
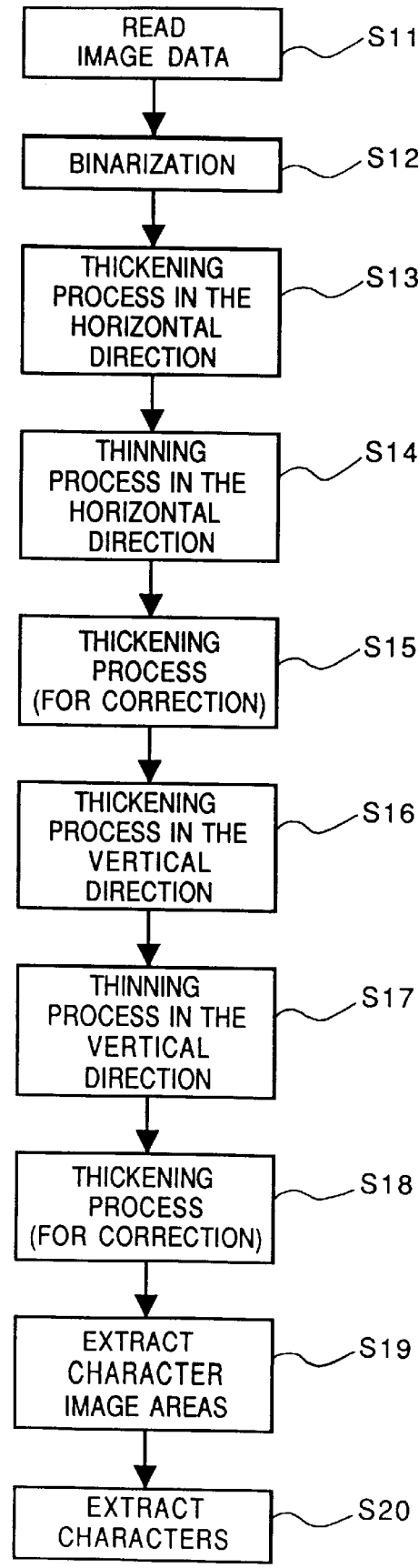
FIG. 5 is a flowchart explaining a process according to a second embodiment.

A second embodiment is described with reference to a flowchart in FIG. 5. Note that a program based on the flowchart in FIG. 5 is stored in the program memory 6 in FIG. 1 in order to perform a process according to the second embodiment.

First, at step S11, image data is read by the scanner 1, and stored in the RAM 2. Then, at step S12, the input image data is binarized. At step S13, a thickening process is applied to an arbitrary dot, $f_{ij}$, of the binarized image data outputted at step S12 based on the following equation (3) (binarized data of a dot position, $g_{ij}$, is determined).

$$g_{ij} = \begin{cases} 1; & fij = 1, \text{ or either a right} \\ & \text{or left pixel} = 1 \\ 0; & \text{otherwise} \end{cases} \quad (3)$$

The thickening process is performed in only the horizontal direction, thus widths of vertical lines become thicker than the vertical lines in the original image data as well as characters stretching in the horizontal direction can be joined. The number of times to repeat the thickening process is determined in the same manner as described in the first embodiment. Next at step S14, a thinning process is applied to an arbitrary dot, $f_{ij}$, of the image data outputted at step S13 based on the following equation (4).

$$g_{ij} = \begin{cases} 0; & f_{ij} = 0, \text{ or either a right} \\ & \text{or left pixel} = 0 \\ 1; & \text{otherwise} \end{cases} \quad (4)$$

where if $f_{ij}$ before the thinning process is "1" and both the right and left pixels are "1", then $f_{ij}$ remains "1".

The number of times to repeat the thinning process is determined in the same manner as described in the first embodiment. If the numbers of times to repeat the thickening process based on the equation (3), and the thinning process based on the equation (4), are m1 and n1, respectively, when m1<n1, vertical lines disappear. The size of joined significant dots representing a character string in the image after the thinning process is smaller than an area representing characters in the original image data. Therefore, the thickening process based on the equation (3) is applied to the processed image (n1–m1) times, at step 15.

Then, at step S16, a thickening process is performed on an arbitrary dot, fij, of the image data outputted at step S15, based on the following equation (5). Note that the number of times to repeat the thickening process is determined in the same manner as at step S13.

$$g_{ij} = \begin{cases} 1; & f_{ij} = 1, \text{ or a pixel either above} \\ & \text{or below} = 1 \\ 0; & \text{otherwise} \end{cases} \quad (5)$$

The thickening process is performed in the vertical direction, and widths of horizontal lines become thicker than the horizontal lines in the original image data as well as characters stretching in the vertical direction can be joined. Next at step S17, a thinning process is applied to an arbitrary dot, $f_{ij}$, of the image data outputted at step S16 based on the following equation (6).

$$g_{ij} = \begin{cases} 0; & f_{ij} = 0, \text{ or a pixel either above} \\ & \text{or below} = 0 \\ 1; & \text{otherwise} \end{cases} \quad (6)$$

where if fij before the thinning process is "1" and both the above and below pixels are "1", then $f_{ij}$ remains "1".

The number of times to repeat the thinning process is determined in the same manner as described at step S14. If the numbers of times to repeat the thickening process based on the equation (5) and the thinning process based on the equation (6), are m2 and n2, respectively, when m2<n2, horizontal lines disappear. The size of joined significant dots representing characters in the image data after the thickening and thinning processes is smaller than an area representing characters in the original image data. Therefore, the thickening process based on the equation (5) is applied to the processed image (n2–m2) times, at step 18. Next, at step S19, joined significant dots in the image data outputted at step S18 are extracted, and a rectangular area surrounding the joined dots is determined at step S19.

At step S20, a rectangular area which corresponds to the detected rectangular area is extracted from the original image data, then characters are extracted from the extracted rectangular area. A method of separating the characters is the same as the one described in the first embodiment.

According to the second embodiment as described above, by performing the thickening and thinning processes in the vertical and horizontal directions, areas representing characters are extracted faster as compared to the first embodiment, since the addition and elimination of significant dots are performed in the vertical and horizontal directions only.

A third embodiment will be explained with reference to FIG. 6. In this embodiment, a program which controls a following procedure is also stored in the program memory 6 as in the second embodiment.

Figure 6:
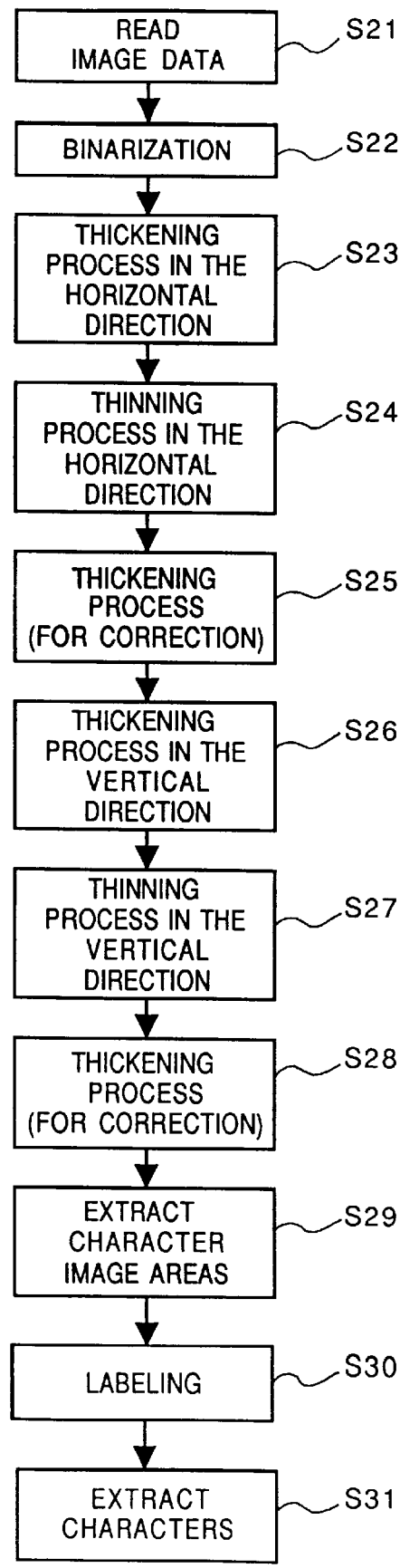
FIG. 6 is a flowchart explaining a process according to a third embodiment.

In the third embodiment, a rectangular area including characters is extracted from the original image at steps S21 to S29 in the same method as described in the second embodiment (steps S21 to S29 in FIG. 6 correspond to steps S11 to S19 in FIG. 5, respectively). Next, at step S30, an identical and unique number is assigned to each significant pixel joined to a next significant pixel inside of the rectangular area (labeling). At step S31, characters are extracted by considering the relative positions of each labeled group of pixels.

For example, in order to label a character image, "aj", "1" is assigned to pixels which construct "a", "2" is assigned to a pixel constructing the point of "j" (top part of "j"), and "3" is assigned to pixels constructing a lower part of "j" excluding the point.

Then, rectangles surrounding each labeled pixel group and centers of each labeled pixel group are determined. As a result, the pixels making the labeled group 2 and the labeled group 3 are determined to be of the same character, because the distance between the centers of the labeled groups 2 and 3 is much smaller than the distance between the centers of the labeled group 1 and of the labeled group 2 or 3. Likewise, the pixels making the labeled group 1 are considered as being of the same character since the centers of the labeled group 1 and that of the labeled groups 2 and 3 are wide apart. Thus, each character is extracted. More specifically, a threshold value is set, and pixels of a labeled group are determined that they compose a single character if distances between centers of this labeled group and of other labeled groups are larger than the threshold.

Note that in order to extract rectangular areas including characters from original image data, a process shown at steps S1 to S6 in the first embodiment can be utilized.

Binarization is performed by considering significant pixels, however, in a case where an original image, such as a map, includes colors, characters can be extracted by performing the same procedure as described above by considering one of the colors in the original image.

As an example, by further providing a control panel on the image processing apparatus in the embodiment, a color of interest is designated by using a key input to the control panel. Then, the original image data read from the scanner 1 is binarized by assigning "1" to the designated color data and assigning "0" to other colors. The binarized data is stored in the RAM 2. As a result, characters and lines of only the designated color are stored in the RAM 2. Therefore, by performing the same process as described in the above embodiments, only characters can be extracted from the image data stored in the RAM 2, thus colored characters in the original image, such as a map, can be recognized.

Further, a map, for instance, may be printed with a plurality of colors, thus characters of different colors, such as blue characters and red characters, may be found. Therefore, it is more desirable to designate a plurality of colors at color designation. Then, image data of the designated colors is assigned as "1" and other colors are assigned as "0" to binarize the original image data which is scanned by the scanner 1, then the binarized image data is stored in the RAM 2. As a result, it is possible to separate characters of a plurality of colors simultaneously. In addition, the image data stored in the RAM 2 is only characters and lines of the designated colors since the image data of non-designated colors is assigned as "0". Accordingly, the thickening process and the thinning process are simplified, thus the process is performed at high speed.

According to the third embodiment as described above, the processing time can be reduced by erasing lines, extracting areas representing characters, then extracting characters.

Further, the image processing apparatus is constructed with a single device in the above embodiments, however, the present invention can be applied to a system having an image reading unit and a processor, independently, for performing an aforesaid process. For instance, the system can be constructed with an image scanner and a personal computer. Furthermore, the present invention can be enabled by providing an external program to the apparatus or the system.

Note that lines in the embodiments are one dot width, however, a number of dots representing a width of a line changes depending upon the resolution of the scanner, the thickness of a line, the font size, and so on. Thus the number of dots representing the width of a line can be designated by an operator when needed. By changing the number of dots of a line width, the number of times to repeat a thickening process and a thinning process alters in accordance with the designated number of dots.

Further, FIG. 3 shows an example that three lines are placed close to each other. In a case where only one line exists, the timing when the thickening process should stop is not known, since a number of newly added dots after each thickening process keeps increasing. In order to overcome this problem, in a case where the number of newly added dots does not decrease after performing a thickening process predetermined times, the thickening process is set to stop. Therefore, it is desirable to construct the apparatus so as to set a maximum number of times to repeat the thickening process.

Other reasons for setting the maximum number of times to repeat the thickening process are that timings when a character becomes a lump of significant dots and/or when characters join and form a lump, for example, differ depending on reading resolution, font size of an original image, and so on.

As for the reading resolution, an operator does not have to set it each time once the resolution is stored in an apparatus. Whereas, regarding the sizes of characters and widths of lines, they should be designated when necessary from a control panel provided on the apparatus. The size of characters and width of lines can be chosen from three different sizes or widths, for instance.

As another method to set the maximum number of times to repeat thickening and thinning processes, a table composed of reading resolution, designated widths of lines, and maximum numbers of times to repeat a thickening process depending on font sizes, as seen in FIG. 7, is stored in the program memory 6, then the maximum number of times to repeat a thickening process is obtained by the CPU 3 referring to the table.

Figure 8:
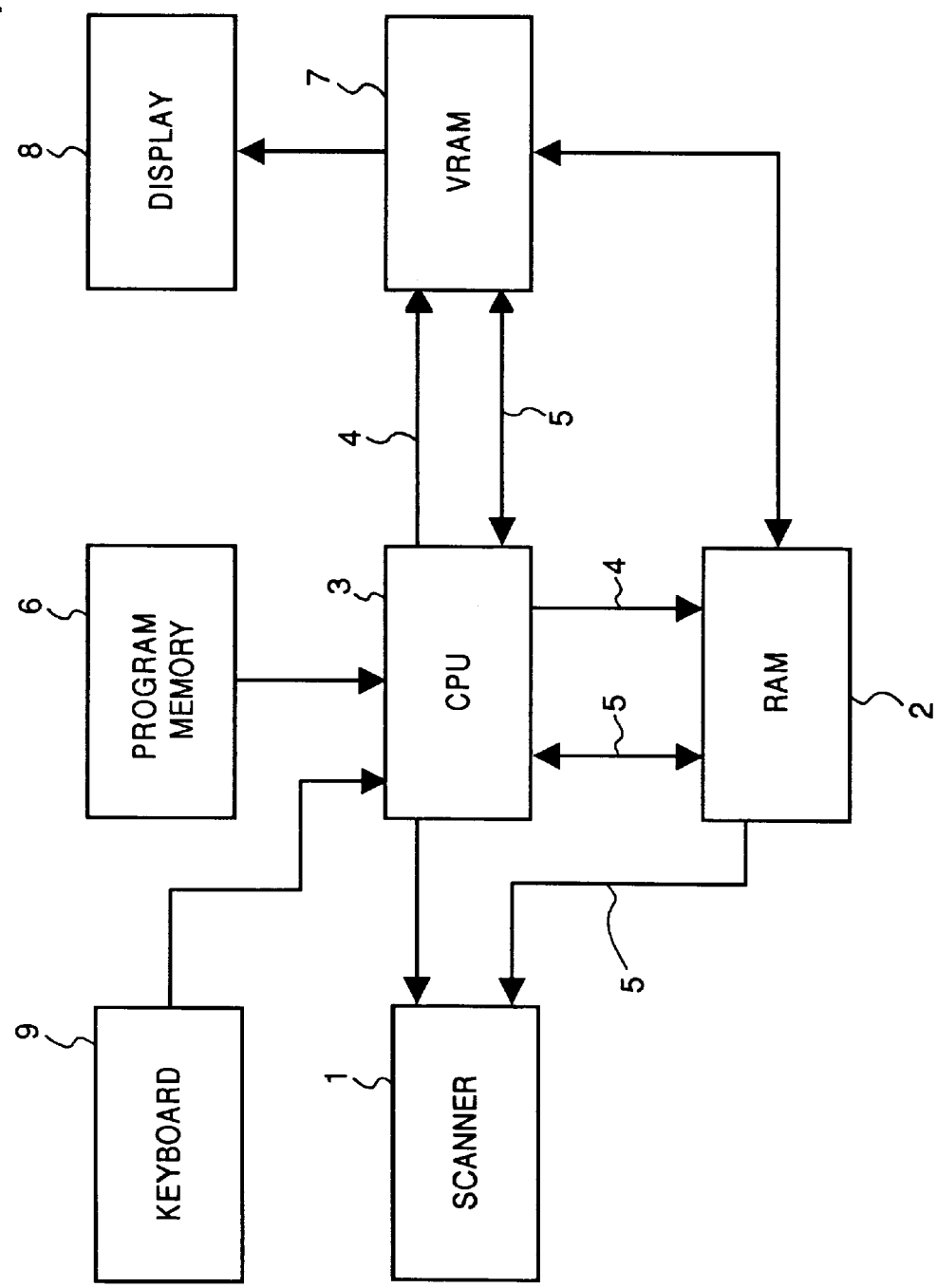
FIG. 8 is a block diagram illustrating a configuration of an image processing apparatus according to another embodiment.

Further, as shown in FIG. 8, an apparatus can be connected to a device, such as a keyboard 9, capable of inputting information, so that the thickness of characters and widths of lines can be inputted. Furthermore, in a case where color data needs to be processed, a color or colors can be designated by using the keyboard 9.

Further, instead of using a keyboard, the above described conditions to be selected can be displayed on the display 8, and selected by pointing to the proper icons, for instance, by using a pointing device, such as a mouse.

Further, an original image is directly inputted from the scanner 1 in the embodiments, however, an image containing characters and lines can be read from a floppy disk, or the like, or can be received via a communication line.

According to the present invention as described above, when an image containing characters and lines is inputted, characters can be efficiently separated from the image.

The present invention can be applied to a system constituted by a plurality of devices, or to an apparatus comprising a single device. Furthermore, the invention is applicable also to a case where the object of the invention is attained by supplying a program to a system or apparatus.

The present invention is not limited to the above embodiments and various changes and modifications can be made within the spirit and scope of the present invention. Therefore, to apprise the public of the scope of the present invention, the following claims are made.

What is claimed is:

1. An image processing apparatus which inputs an image containing characters and lines and separates the characters, comprising:

thickening means for thickening groups of significant dots of the input image;

processing means for repeatedly executing a thickening operation by said thickening means until a number of dots added at an n-th thickening operation decreases as compared with a number of dots added at an (n−1)th thickening operation, wherein "n" is a number of repetitions of the thickening operation and for obtaining an image at an (n−m)th thickening operation wherein "m" is an integer larger than "1";

thinning means for thinning the image obtained by said processing means, at least for a greater number of times than n−m times; and determining means for determining an area of significant dots, obtained as a result of the thinning operation, as a character area.

2. The image processing apparatus according to claim 1, further comprising:

second thickening means for thickening the image, which is thickened and thinned by said thickening and thinning means, on the basis of a number of times the thickening process and the thinning process are repeated; and extracting means for extracting characters from the input image based on an area of significant dots obtained after a second thickening process.

3. The image processing apparatus according to claim 1, wherein the thickening and thinning processes are operated in the vertical and horizontal directions of the image by said thickening and thinning means.

4. The image processing apparatus according to claim 1, wherein said processing means repeatedly executes the thickening operation in a case where a number of times to repeat the thickening process reaches a predetermined value.

5. The image processing apparatus according to claim 4, wherein said predetermined value can be changed.

6. The image processing apparatus according to claim 1, further comprising reading means for reading only a designated color or colors of an original image to be processed by said thickening means, said processing means, said thinning means and said determining means.

7. The image processing apparatus according to claim 6, further comprising setting means for setting a color or colors of the original image to be read by said reading means.

8. An image processing method of inputting an image containing characters and lines and of separating the characters, comprising the steps of:

thickening groups of significant dots of the input image;

repeatedly executing a thickening operation until a number of dots added at an n-th thickening operation decreases as compared with a number of dots added at an (n−1)th thickening operation, wherein "n" is a number of repetitions of the thickening operation, and for obtaining an image at an (n−m)th thickening operation, wherein "m" is an integer larger than "1";

thinning the image obtained by said executing step, at least for a greater number of times than "n−m" times; and determining an area of significant dots, obtained as a result of said thinning step, as a character area.

9. The image processing method according to claim 8, further comprising:

a second thickening step of thickening the image, which is thickened and thinned at said thickening and thinning steps, on the basis of a number of times the thickening step and the thinning step are repeated; and an extracting step of extracting characters from the input image based on an area of significant dots obtained after said second thickening step.

10. The image processing method according to claim 8, wherein said thickening and thinning steps are operated in the vertical and horizontal directions of the image.

11. The image processing method according to claim 8, wherein said executing step repeatedly executes the thickening operation in a case where a number of times to repeat the thickening step reaches a predetermined value.

12. The image processing method according to claim 11, wherein said predetermined value can be changed.

13. The image processing method according to claim 8, further comprising a step of reading only a designated color or colors of an original image to be processed in said thickening step, said executing step, said thinning step and said determining step.

14. The image processing method according to claim 13, further comprising a setting step of setting a color or colors of the original image to be read at said reading step.

15. A computer-readable medium storing a program for executing an image processing method of inputting an image containing characters and lines and of separating the characters, comprising the steps of:

thickening groups of significant dots of the input image;

repeatedly executing a thickening operation until a number of dots added at an n-th thickening operation decreases as compared with a number of dots added at an (n−1)th thickening operation, wherein "n" is a number of repetitions of the thickening operation, and for obtaining an image at an (n−m)th thickening operation, wherein "m" is an integer larger than "1";

thinning the image obtained by said executing step, at least for a greater number of times than "n−m" times; and determining an area of significant dots, obtained as a result of said thinning step, as a character area.

16. A medium according to claim 15, said method further comprising:

a second thickening step of thickening the image, which is thickened and thinned at said thickening and thinning steps, on the basis of a number of times the thickening step and the thinning step are repeated; and an extracting step of extracting characters from the input image based on an area of significant dots obtained after said second thickening step.

17. A medium according to claim 15, wherein said thickening and thinning steps are operated in the vertical and horizontal directions of the image.

18. A medium according to claim 15, wherein said executing step repeatedly executes the thickening operation in a case where a number of times to repeat the thickening step reaches a predetermined value.

19. A medium according to claim 18, wherein said predetermined value can be changed.

20. A medium according to claim 15, further comprising a reading step of reading only a designated color or colors of an original image to be processed in said thickening step, said executing step, said thinning step and said determining step.

21. A medium according to claim 20, said method further comprising a setting step of setting a color or colors of the original image to be read at said reading step.

* * * * *

UNITED STATES PATENT AND TRADEMARK OFFICE
CERTIFICATE OF CORRECTION

PATENT NO. : 5,974,191

DATED : October 26, 1999

INVENTOR(S) : HARADA ET AL.

It is certified that error appears in the above-identified patent and that said Letters Patent is hereby corrected as shown below:

<u>IN THE DRAWINGS</u>:
Sheet 1, Figure 1, replace with the following:

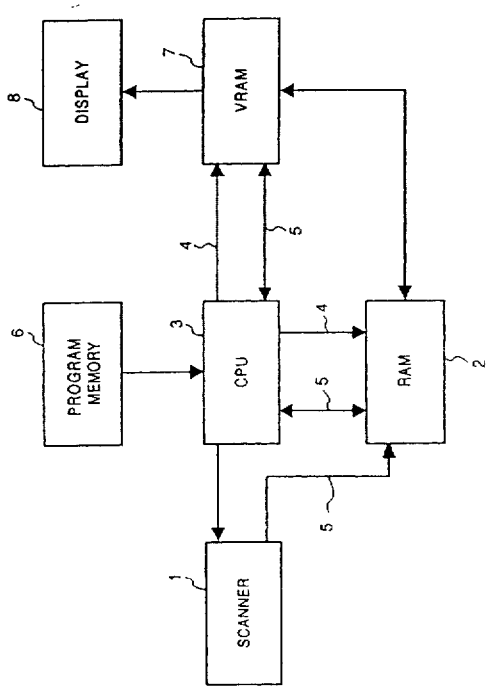

UNITED STATES PATENT AND TRADEMARK OFFICE
CERTIFICATE OF CORRECTION

PATENT NO. : 5,974,191

DATED : October 26, 1999

INVENTOR(S) : HARADA ET AL.

Page 2 of 5

It is certified that error appears in the above-identified patent and that said Letters Patent is hereby corrected as shown below:

IN THE DRAWINGS:
  Sheet 7, Figure 7, replace with the following:

FIG. 7

| RESOLUTION | WIDTHS OF LINES | FONT SIZE | MAXIMUM NUMBER OF TIMES TO REPEAT THICKENING PROCESS |
|---|---|---|---|
| 200 | THIN | SMALL | $n_1$ |
| 200 | THIN | MEDIUM | $n_2$ |
| 200 | THIN | LARGE | $n_3$ |
| 200 | MEDIUM | SMALL | $n_4$ |
| 200 | MEDIUM | MEDIUM | $n_5$ |
| 200 | MEDIUM | LARGE | $n_6$ |
| 200 | THICK | SMALL | $n_7$ |
| ⋮ | ⋮ | ⋮ | ⋮ |
| 400 | THIN | SMALL | $n_m$ |
| ⋮ | ⋮ | ⋮ | ⋮ |

UNITED STATES PATENT AND TRADEMARK OFFICE
CERTIFICATE OF CORRECTION

PATENT NO. : 5,974,191

DATED : October 26, 1999

INVENTOR(S): HARADA ET AL.

Page 3 of 5

It is certified that error appears in the above-identified patent and that said Letters Patent is hereby corrected as shown below:

IN THE DRAWINGS:
Sheet 8, Figure 8, replace with the following:

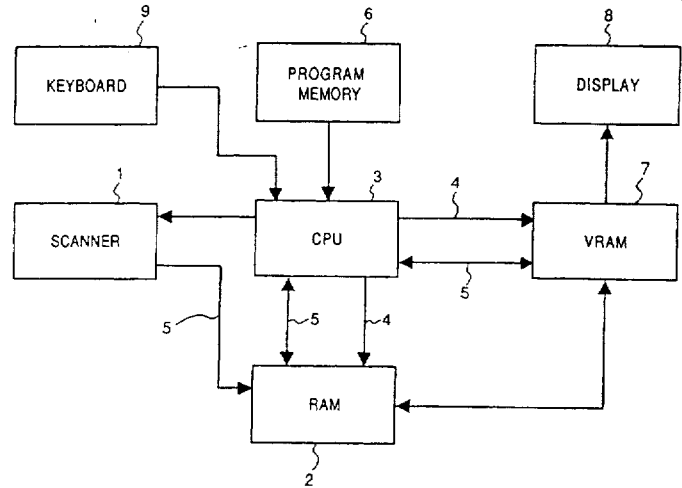

FIG. 8

UNITED STATES PATENT AND TRADEMARK OFFICE
CERTIFICATE OF CORRECTION

PATENT NO. : 5,974,191

DATED : October 26, 1999

INVENTOR(S) : HARADA ET AL.

It is certified that error appears in the above-identified patent and that said Letters Patent is hereby corrected as shown below:

COLUMN 1:
Line 16, "on," should read --on, and--.

COLUMN 2:
Between Lines 35 and 36 --[First Embodiment]-- should be inserted.

COLUMN 3:
Line 18, "492(=(75+2×2+(3+2)×2)×3)." should read --492(=(75+2)×2+(3+2)×2)×3).--.
Line 23, "Thus" should read --Thus,--.
Line 57, "processing" should read --processing,--.

COLUMN 4:
Line 37, "including," should read --including--.
Line 39, "recognition" should read --recognizing--.
Between Lines 43 and 44, --[Second Embodiment]-- should be inserted.

COLUMN 6:
Between Lines 5 and 6, --[Third Embodiment]-- should be inserted.

UNITED STATES PATENT AND TRADEMARK OFFICE
CERTIFICATE OF CORRECTION

PATENT NO. : 5,974,191

DATED : October 26, 1999

INVENTOR(S) : HARADA ET AL.

It is certified that error appears in the above-identified patent and that said Letters Patent is hereby corrected as shown below:

COLUMN 7:
  Line 22, "Thus" should read --Thus,--.

COLUMN 8:
Lines 31 & 32 "operation" should read --operation,--.

Signed and Sealed this

Twenty-eighth Day of November, 2000

Attest:

Q. TODD DICKINSON

Attesting Officer

Director of Patents and Trademarks